(12) United States Patent
Weber et al.

(10) Patent No.: US 7,271,951 B2
(45) Date of Patent: Sep. 18, 2007

(54) CARDS AND LAMINATES INCORPORATING MULTILAYER OPTICAL FILMS

(75) Inventors: Michael F. Weber, Shoreview, MN (US); Diane North, Inver Grove Heights, MN (US); David K. Mortenson, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 163 days.

(21) Appl. No.: 11/132,114

(22) Filed: May 18, 2005

(65) Prior Publication Data

US 2005/0259326 A1 Nov. 24, 2005

Related U.S. Application Data

(60) Provisional application No. 60/573,583, filed on May 22, 2004.

(51) Int. Cl.
*F21V 9/04* (2006.01)
*F21V 9/06* (2006.01)
*G02B 5/08* (2006.01)
*G02B 5/20* (2006.01)
*B42D 15/00* (2006.01)
*G06K 19/02* (2006.01)
*G02B 5/28* (2006.01)

(52) U.S. Cl. .................. 359/359; 359/589; 283/91; 235/488

(58) Field of Classification Search ............. 359/359, 359/589; 283/87, 88, 91, 57; 235/488, 491
See application file for complete search history.

(56) References Cited

U.S. PATENT DOCUMENTS

| 3,536,894 A | 10/1970 | Travioli |
| 3,610,729 A | 10/1971 | Rogers |
| 3,711,176 A | 1/1973 | Alfrey, Jr. et al. |
| 4,446,305 A | 5/1984 | Rogers et al. |
| 4,540,623 A | 9/1985 | Im et al. |
| 5,005,873 A | 4/1991 | West |

(Continued)

FOREIGN PATENT DOCUMENTS

EP 1 350 618 10/2003

(Continued)

OTHER PUBLICATIONS

International Standard, ISO/IEC 7810, "Identification cards—Physical characteristics", Third edition, Nov. 1, 2003.

(Continued)

*Primary Examiner*—Alessandro Amari
(74) *Attorney, Agent, or Firm*—William D. Miller

(57) ABSTRACT

New constructions of multilayer optical films, laminates thereof, and cards incorporating same are disclosed. In a card, the multilayer optical film can be sandwiched between relatively thick polymer layers using adhesive layers that are at least 0.5 mils thick but that may collectively account for no more than 3 mils of thickness. The cards can if desired be highly transmissive in the visible yet highly opaque in portions of the infrared. The resulting cards can have reduced angel hair formation during card stamping, increased resistance to delamination, and reduced haze.

20 Claims, 4 Drawing Sheets

U.S. PATENT DOCUMENTS

| | | |
|---|---|---|
| 5,300,764 A | 4/1994 | Hoshino et al. |
| 5,448,404 A | 9/1995 | Schrenk et al. |
| 5,882,774 A | 3/1999 | Jonza et al. |
| 6,034,813 A | 3/2000 | Woodard et al. |
| 6,045,894 A | 4/2000 | Jonza et al. |
| D436,620 S | 1/2001 | Webb et al. |
| D438,562 S | 3/2001 | Webb et al. |
| D438,563 S | 3/2001 | Webb et al. |
| D442,222 S | 5/2001 | Webb et al. |
| D442,627 S | 5/2001 | Webb et al. |
| D442,628 S | 5/2001 | Webb et al. |
| D442,629 S | 5/2001 | Webb et al. |
| D443,298 S | 6/2001 | Webb et al. |
| D447,515 S | 9/2001 | Faenza, Jr. et al. |
| 6,290,137 B1 | 9/2001 | Kiekhaefer |
| D449,336 S | 10/2001 | Webb et al. |
| 6,296,188 B1 | 10/2001 | Kiekhaefer |
| 6,368,699 B1 | 4/2002 | Gilbert et al. |
| 6,395,124 B1 | 5/2002 | Oxman et al. |
| 6,459,514 B2 | 10/2002 | Gilbert et al. |
| 6,510,993 B1 | 1/2003 | Kiekhaefer |
| 6,531,230 B1 | 3/2003 | Weber et al. |
| 6,569,515 B2 * | 5/2003 | Hebrink et al. ............. 428/212 |
| 6,581,839 B1 | 6/2003 | Lasch et al. |
| 6,630,283 B1 | 10/2003 | Simpson et al. |
| 6,705,530 B2 | 3/2004 | Kiekhaefer |
| 6,732,936 B1 | 5/2004 | Kiekhaefer |
| 6,749,123 B2 | 6/2004 | Lasch et al. |
| 6,764,014 B2 | 7/2004 | Lasch et al. |
| 6,783,349 B2 | 8/2004 | Neavin et al. |
| 6,927,900 B2 | 8/2005 | Liu et al. |
| 2002/0066790 A1 | 6/2002 | Cocco |
| 2002/0130186 A1 | 9/2002 | Lasch et al. |
| 2002/0145049 A1 | 10/2002 | Lasch et al. |
| 2002/0163179 A1 | 11/2002 | Dubner et al. |
| 2003/0017312 A1 | 1/2003 | Labrousse et al. |
| 2003/0141373 A1 | 7/2003 | Lasch et al. |
| 2003/0217806 A1 | 11/2003 | Tait et al. |
| 2004/0020992 A1 | 2/2004 | Lasch et al. |
| 2004/0046034 A1 | 3/2004 | Ey Yamani et al. |
| 2004/0118930 A1 | 6/2004 | Berardi et al. |
| 2004/0256469 A1 | 12/2004 | Faenza, Jr. et al. |
| 2005/0051633 A1 | 3/2005 | Lasch et al. |

FOREIGN PATENT DOCUMENTS

| | | |
|---|---|---|
| WO | WO99/39224 | 8/1999 |
| WO | WO 01/18745 | 3/2001 |
| WO | WO 01/25872 | 4/2001 |
| WO | WO 01/41044 | 6/2001 |
| WO | WO 02/05204 | 1/2002 |
| WO | WO 02/45008 | 6/2002 |

OTHER PUBLICATIONS

"Light Transmissive Cards with Suppression of UV-Induced Fluorescence", Mar. 9, 2005, IP.com.

U.S. Application entitled "Light Transmissive Cards with Suppression of UV-induced Fluorescence", filed on Mar. 4, 2005, having U.S. Appl. No. 11/072,154.

Weber, Michael F., "Giant Birefringent Optics in Multilayer Polymer Mirrors", Science, vol. 287, Mar. 31, 2000.

\* cited by examiner

CARDS AND LAMINATES INCORPORATING MULTILAYER OPTICAL FILMS

CROSS REFERENCE TO RELATED APPLICATIONS

This application claims priority to U.S. Provisional Patent Application No. 60/573,583, filed May 22, 2004.

FIELD OF THE INVENTION

The present invention relates to multilayer optical films. The invention further relates to laminates and cards that incorporate multilayer optical films, and methods relating thereto. At least some embodiments of such films, laminates, and cards have at normal incidence a high average transmission of visible light and selectively reflect or otherwise block at least a portion of electromagnetic radiation whose wavelength is greater than about 700 nm.

BACKGROUND

Multilayer optical films, which can provide desirable transmission and/or reflection properties at least partially by an arrangement of optically thin layers ("microlayers") of differing refractive index, are known. It has long been known to make such multilayer optical films by depositing a sequence of inorganic materials in microlayers on a substrate in a vacuum chamber. Typically, the substrate is a relatively thick piece of glass, limited in size due to constraints on the vacuum chamber volume and/or the degree of uniformity possible by the deposition process.

BRIEF SUMMARY

The present application discloses alternative constructions for multilayer optical films, alternative constructions for laminates incorporating such films, and alternative constructions for cards incorporating such laminates.

For example, a visible light transmissive card can comprise a first and second relatively thick polymer layer between which is disposed a multilayer optical film. The thick polymer layers can each have a thickness of at least 5 mils (125 μm), or at least about 10 mils (250 μm), and the multilayer optical film can have a reflection band at normal incidence substantially covering the wavelength range 800-1000 nm. The card also includes a plurality of adhesive layers between the multilayer optical film and the first and second polymer layers, but the card is constructed in such a way that it has a haze no greater than 12%, or nor greater than 10%.

As another example, a card can comprise a relatively thick first and second polymer layer between which is disposed a multilayer optical film, where the multilayer optical film has a reflection band at normal incidence covering a desired spectral region. The card also includes a plurality of adhesive layers between the multilayer optical film and the first and second polymer layers. For enhanced film integrity, the multilayer optical film can comprise alternating layers of coPEN and a copolyester such as PETG. The multilayer optical film can also comprise two or more packets of microlayers separated by protective boundary layers.

In some embodiments, only a single layer of adhesive lies between the multilayer optical film and each of the thick polymer layers. Such adhesive layers are preferably at least half of a mil thick, but collectively make up no more than about 2 or 3 mils in thickness. In some constructions, the card, laminate, and film are all substantially free of polyvinyl chloride (PVC).

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF THE ILLUSTRATIVE EMBODIMENTS

The present specification teaches how alternative multilayer optical film, laminate, and card constructions can provide enhanced clarity, delamination properties, and manufacturability relative to existing products. This can be done by appropriate combinations of adhesive distribution and thickness, adhesive durometer (or "hardness"), interlayer cohesion of the multilayer optical film, and the tensile strength of the multilayer optical film skin layers.

Multilayer optical films have been demonstrated by coextrusion of alternating polymer layers. See, e.g., U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and U.S. Patent Publication 2001-0022982 A1 (Neavin et al.), "Apparatus For Making Multilayer Optical Films", all of which are incorporated herein by reference. See also PCT Publication WO 03/100521 (Tait et al.), "Method For Subdividing Multilayer Optical Film Cleanly and Rapidly", also incorporated herein by reference. In such polymeric multilayer optical films, polymer materials are used predominantly or exclusively in the makeup of the individual layers. Such films are compatible with high volume manufacturing processes, and can be made in large sheets and roll goods.

Figure 1:
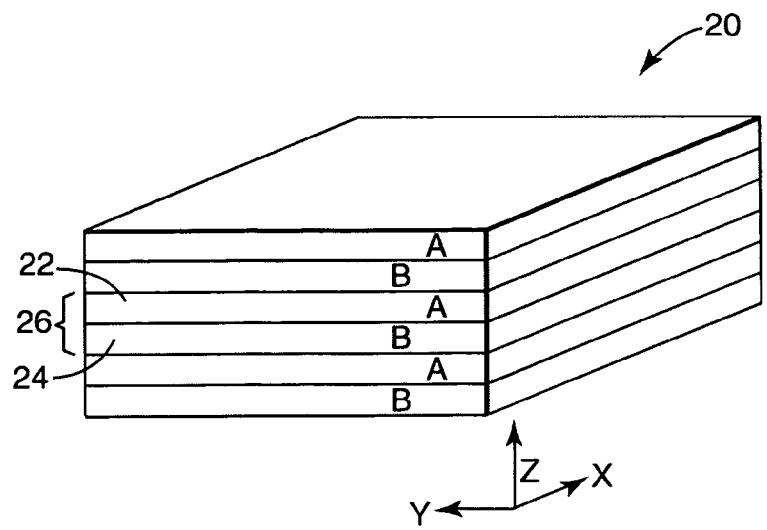
FIG. 1 is a greatly magnified perspective view of a known multilayer optical film.

FIG. 1 depicts a known multilayer optical film 20. The film comprises individual microlayers 22, 24. The microlayers have different refractive index characteristics so that some light is reflected at interfaces between adjacent microlayers. The microlayers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. Thicker layers can, however, also be included, such as skin layers at the outer surfaces of the film, or protective boundary layers disposed within the film that separate packets of microlayers.

The reflective and transmissive properties of multilayer optical film 20 are a function of the refractive indices of the respective microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively (see FIG. 1). In practice, the refractive indices are controlled by judicious materials selection and processing conditions. Film 20 can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. In order to achieve high reflectivities with a reasonable number of layers, adjacent microlayers preferably exhibit a difference in refractive index ($\Delta n_x$) for light polarized along the x-axis of at least 0.05. If the high reflectivity is desired for two orthogonal polarizations, then the adjacent microlayers also preferably exhibit a difference in refractive index ($\Delta n_y$) for light polarized along the y-axis of at least 0.05. Otherwise, the refractive index difference $\Delta n_y$ can be less than 0.05 and preferably about 0 to produce a multilayer stack that reflects normally incident light of one polarization state and transmits normally incident light of an orthogonal polarization state.

If desired, the refractive index difference ($\Delta n_z$) between adjacent microlayers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta N_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$. More preferably, $\Delta n_z \leq 0.25 *$ $\Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Alternatively, the multilayer optical film can have a simpler construction in which all of the polymeric microlayers are isotropic in nature, i.e., $n_x = n_y = n_z$ for each layer. Furthermore, known self-assembled periodic structures, such as cholesteric reflecting polarizers and certain block copolymers, can be considered multilayer optical films for purposes of this application. Cholesteric mirrors can be made using a combination of left and right handed chiral pitch elements.

Recent trends in card fashions have created a demand for visible light transmissive cards ("VLT cards", see definition below) for financial transaction card applications. It can be desirable for such VLT cards to be as highly transparent and clear as possible, while in some cases a moderate amount of haze or coloration may be desirable. A challenge is presented when these cards are to be used in card reading machines such as Automated Teller Machines (ATMs) and the like. Such machines typically include edge sensors that utilize infrared (IR) light to detect the presence of the card. Unless the cards block such IR light sufficiently, the edge sensor is not tripped and the card reading machine does not acknowledge the presence of the card. Some card manufacturing equipment also uses IR edge sensors. Cards produced on such equipment must also block the necessary IR light. ISO standard No. 7810 (Rev. 2003) is believed to specify an optical density (OD)>1.3 (corresponding to <5% transmission) throughout the range 850-950 nm, and an OD>1.1 (corresponding to <7.9% transmission) throughout the range 950-1000 nm.

Thus, a challenge for VLT cards has been to be as highly transparent as possible over the visible wavelengths, but then to substantially block most IR light at least from about 800 to 1000 nm. In this wavelength range, average transmission of less that 5% is preferred, but transmission of 8% is also acceptable. In some card detection systems, average IR transmission as high as 10% or 15% may also be acceptable. As with other cards, VLT cards are also commonly expected to retain their integrity and appearance, and not delaminate in use.

Figure 2:
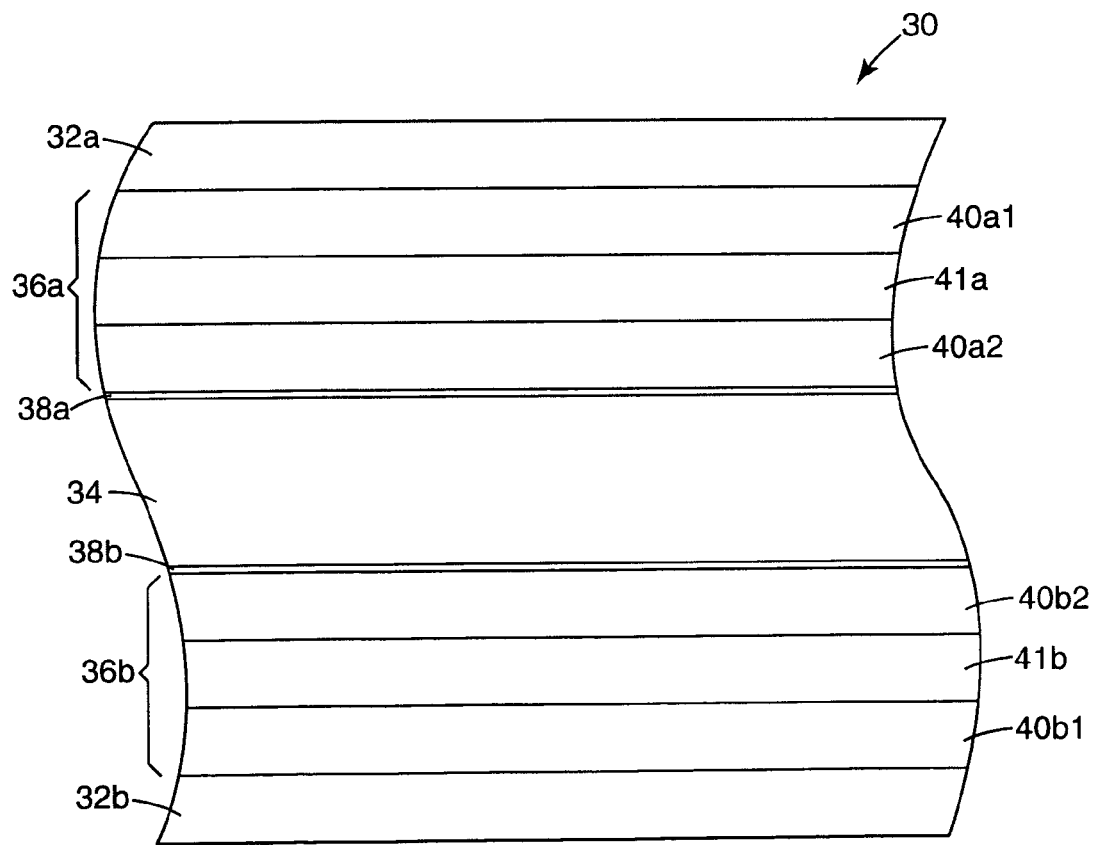
FIG. 2 is a schematic sectional view of a known laminate construction comprising a multilayer optical film.

FIG. 2 shows a sectional view of a known IR filter laminate 30 that has been used in the construction of known VLT financial transaction cards. Laminate 30 comprises: outer polyvinyl chloride (PVC) layers 32a, 32b; a central multilayer optical film 34 (the individual microlayers and skin layers of which are not shown for ease of illustration), which film 34 is highly transparent in the visible and has an IR reflection band; and compound bonding layers 36a, 36b. Laminate 30 also includes thin layers of primer 38a, 38b applied to the major surfaces of the multilayer optical film 34. Bonding layers 36a and 36b, sold by Transilwrap Company of Franklin Park, Ill. as KRTY 1/1/1 adhesive, consist of a layer of polyethylene terephthalate (PET) 41a, 41b to which layers of hot melt adhesive 40a1, 40a2, and 40b1, 40b2 have been applied to the respective major surfaces of the PET layers as shown. Construction details of the known IR filter laminate 30 are as follows:

PVC layer 32a: nominal thickness 1 mil (25 μm)

Compound bonding layer 36a: nominal thickness 3 mils (75 μm). Transilwrap KRTY 1/1/1.

Adhesive layer 40a1: nominal thickness 1 mil (25 μm). Composition includes polyethylene and polyethyl acrylate.

PET layer 41a: nominal thickness 1 mil (25 μm).

Adhesive layers 40a2, 40b1, 40b2: same as layer 40a1.

Primer layer 38a: nominal thickness about 0.1-0.2 μm. The layer is derived from a coated composition that includes a first and second sulfopolyester component, a surfactant (Triton X-100) and a crosslinker (Neocryl CX-100), all in a deionized water base. The coating composition is typically from 5% to 10% solids. The first sulfopolyester component is made by a standard polyester reaction chemistry using a batch kettle process with the following reaction products: sulfosodium isophthalic acid (2.75 mol %), terephthalic acid (23.5 mol %), isophthalic acid (23.75 mol %), neopentyl glycol (16.5 mol %), and ethylene glycol (33.5 mol %). The second sulfopolyester component is Eastek 1100, a product of the Lawter Chemical Division of Eastman Chemical. The MOF should be treated with a corona discharge prior to coating on the primer layer.

Multilayer optical film 34: nominal thickness 2.55 mil (65 μm). Completely polymeric, coextruded, biaxially oriented, composed of alternating layers of PET/coPMMA. Includes outer PET skin layers that are each nominally 12-13 μm thick, and a single central packet of 275 microlayers characterized by a thickness gradient. The coPMMA layers have $n_x=n_y=n_z=1.49$; the PET layers have in-plane indices $n_x=n_y=1.65$, and an out-of-plane index $n_z=1.49$.

Primer layer 38b: same as layer 38a.

Compound bonding layer 36b: same as layer 36a.

PVC layer 32b: same as layer 32a.

Overall laminate 30: nominal thickness 10.5 mil (265 μm)

The IR filter laminate 30 is constructed by unwinding and feeding five separate sheets—PVC layers 32a, 32b, compound bonding layers 36a, 36b, and primed multilayer optical film 34—into a heated nip, thereby forming a roll of such laminate 30. Laminate 30 is then cut into large sheets, and inserted between two similarly sized sheets of thick PVC card stock (nominal thickness about 9 mils (225 μm)), along with printing, integrated circuit chips, and so forth as desired, in a lamination press that subjects the assembled elements to heat and pressure sufficient to fuse adjacent PVC layers together. Lamination temperatures can range from about 280-300° F. (137-149° C.). The resulting large, stiff card sheet is then subjected to a die cut procedure in which individual standard size financial transaction cards are punched out of the larger card sheet. See, e.g., U.S. Pat. No. 6,581,839 (Lasch et al.) "Transaction Card"; US Patent Application Publication U.S. 2002/0145049 A1 (Lasch et al.) "Transaction Card"; and U.S. Patent Application Publication U.S. 2002/0130186 A1 (Lasch et al.) "Transaction Card", each of which is incorporated herein by reference. During the die cut procedure, an undue amount of extraneous polymer filaments known as "angel hair" can be generated along the edges of the punched cards when using the known card sheets incorporating the known IR filter laminate 30. Such polymer filaments can pose a substantial annoyance to the card manufacturer.

Figure 3:
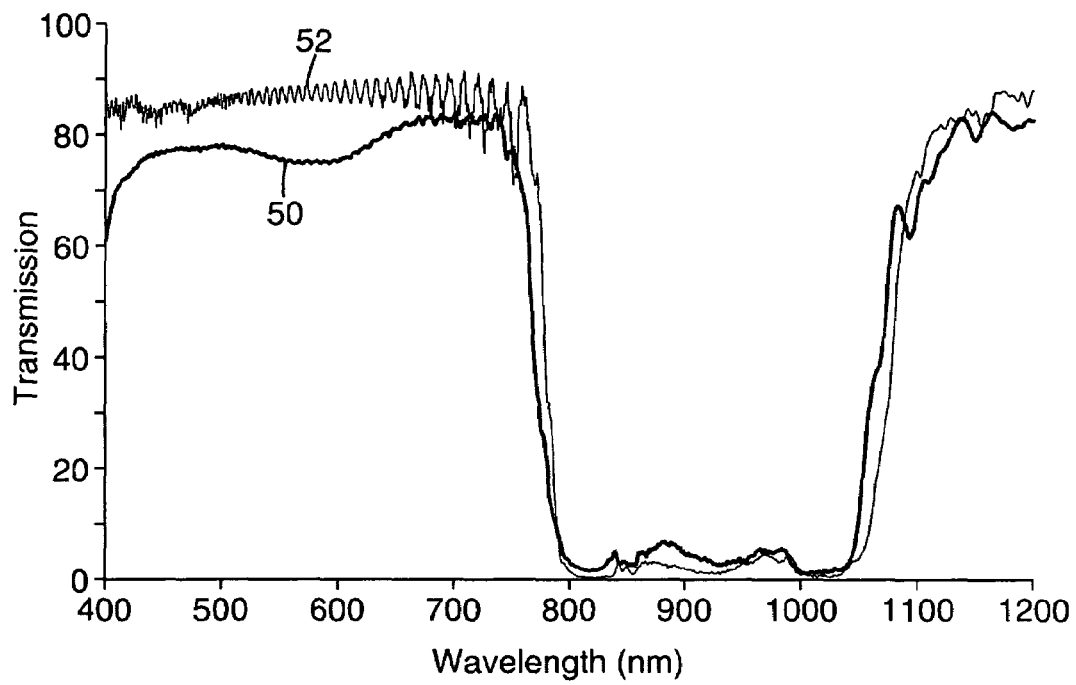
FIG. 3 is a spectral transmission graph for a known multilayer optical film and for a known clear card having incorporated therein such a multilayer optical film.

Nevertheless, the resulting known cards have a high transmission throughout the visible region and adequate IR blocking for use in card reading machines. FIG. 3 shows a typical measured spectral transmission 50 of the clearest portion of such a card (unobstructed by printing, IC chip, etc.). FIG. 3 also depicts the measured spectral transmission 52 of a typical multilayer optical film 30 by itself. (These spectral transmission measurements were made on a Perkin-Elmer Lambda-19 spectrophotometer, at normal incidence, and used an integrating sphere to collect all light transmitted through the card, regardless of scattering direction in the output hemisphere. The measured spectral transmission does not correct for surface reflections.) Of course, the reflection band of the multilayer optical film shifts to shorter wavelengths as the angle of incidence increases. The transmission of the finished card in the visible portion of the spectrum is lower than that of the bare multilayer optical film 30. This is believed to be due to color additives in the PVC layers, and scattering or haze caused by the four relatively thick (1 mil) adhesive layers and the PVC layers. The haze of the finished cards is a function of the card sheet lamination conditions of time, temperature, and pressure, but typically ranges from 20-41%. Some experimental trials at particularly high temperatures, however, have achieved haze readings as low as 14%. In this regard, the "haze" is as measured under standard laboratory conditions on a BYK Gardner Hazegard™ Plus hazemeter. The haze of the multilayer optical film 30 by itself, measured in the same way, is typically about 3%.

Another card property that can be an important consideration is the durability or susceptibility of the card to delamination. Existing standards for cards recommend that the "peel forces" between any laminated layers be above 3.5 N/cm (meaning Newtons of force per width in centimeters of a card laminate) over the entire length of the peel, although higher values such as at least 7 N/cm or even 10 N/cm are also desirable. Where the card incorporates a multilayer optical film as a reflective component such as an IR blocking component, the inter-layer integrity of microlayers, protective boundary layers, and skin layers of the multilayer optical film become important. Also, properties of the adhesive layers that contact the major surfaces of the multilayer optical film (whether directly or through a thin primer layer) can also become important.

Figure 4:
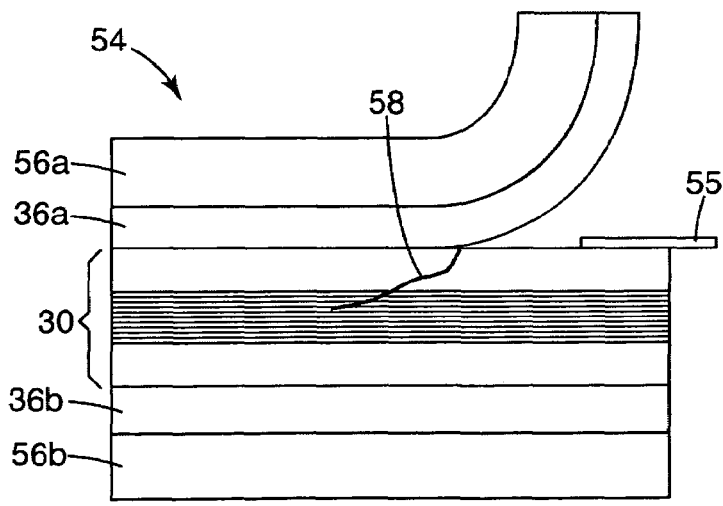
FIG. 4 is a schematic sectional view of a card or portion thereof undergoing a peel test.
Figure 5:
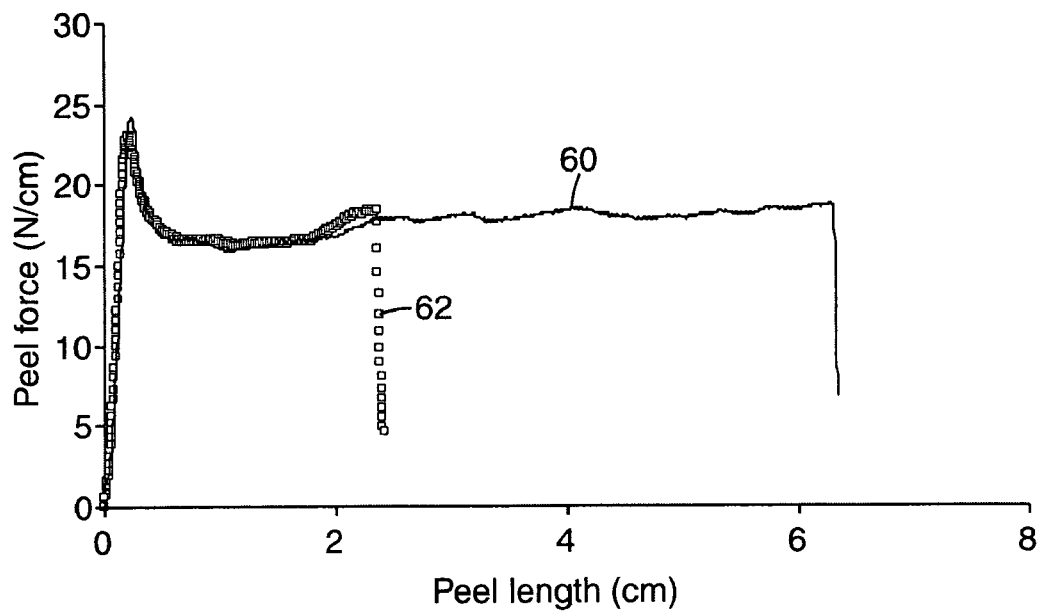
FIG. 5 is a graph showing representative peel strength tests on known cards incorporating a known laminate construction.

FIG. 4 depicts schematically a VLT card or card sheet 54 (or portion thereof) undergoing a peel test to measure delamination strength between adhesive layer 36a and multilayer optical film 30. The outer skin layers and central microlayer packet of film 30 are shown (not to scale) for illustrative purposes. Also shown are thick PVC card stock layers 56a, 56b, each about 10 mils thick (resulting from the respective 1-mil PVC layers 32a, 32b fused to the thick PVC card stock sheets and any additional PVC overlay layers). Primer layers, printing, and other card elements are not shown for simplicity. In preparation for a 180 degree peel test, a cut can be made into the card sheet, or a thin polymer tab 55 can be inserted as shown at the interface under test before the card sheet lamination step. After lamination, the peel is initiated at the cut or tab, and the peel force per linear width is monitored together with the length of the peel. VLT card sheets 54 were cut into strips 12.5 cm long. The maximum peel length in a test of such strips is then 25 cm, since each half can peel up to 12.5 cm. Results of some typical 180 degree peel tests (see curves 60 and 62) for cards using the known laminate 30 are shown in FIG. 5. As shown, although the measured peel forces easily exceed 3.5 N/cm initially, the peel strip often breaks before reaching the end of the test strip, i.e., before reaching the complete peel length. See break 58 depicted in FIG. 4. The break occurred for curve 62 after slightly over 2 cm of peel length, while the break for curve 60 occurred at about 6 cm of peel length. (Note that the instrument stops collecting data after break even though the force drops to zero.)

It would be advantageous to achieve haze levels for VLT cards that are consistently below 20%, more preferably below 14%, 12%, or even 10%, while still: (1) maintaining a high average visible light transmission of at least 50% and more preferably of at least 70% or even 80%, and (2) maintaining adequate IR blocking so that the cards are compatible with card reading machines. It would also be advantageous to improve the strength and integrity (relative to delamination failures) of cards that incorporate multilayer optical film in their construction. Finally, it would be advantageous to provide a multilayer optical film laminate construction that avoids the formation of extraneous polymer filaments during die cutting processes.

Multilayer optical film 34 described above is tough and flexible, but the interlayer adhesion of the PET and coPMMA layers is not high. Special care must therefore be taken in selection of the adhesive for bonding this film to the thick PVC card stock in a card construction. If the adhesive is too hard or brittle, or too thin, forces applied to the opposite card halves are focused to a small region in the cleavage area between the two halves. A thick soft adhesive spreads the peel forces over a wider area at the cleavage point of delamination when pulling apart the halves of a card during a peel test. For this reason the measured peel strength between the thick PVC card stock and the MOF for the known cards discussed above is much higher than the peel strength between the microlayers or other layers of the multilayer optical film itself. The tradeoff for using an adhesive of excess thickness or softness however can be card punching problems that may arise, such as angel hair or dies gumming up. Since there are practical limits to the adhesive thickness and softness, the MOF construction itself can be modified to produce a card with a higher peel strength between MOF and adhesive while preventing rupture of the MOF. MOF constructions with higher interlayer adhesion than the known PET/coPMMA system can be produced. We have also found that the resistance of the MOF to rupture can also depend on the presence of a skin layer having good tensile strength.

The force that results in a rupture of the MOF during a peel test depends on at least four parameters: the thickness of the adhesive, the softness/hardness (durometer) of the adhesive, the strength of the adhesive bond to the MOF, the interlayer adhesion value of the MOF itself, and in some cases the tensile strength of the MOF skin layer. These parameters can all be controlled to yield a card peel force well in excess of the ISO recommended value of 3.5 N/cm while simultaneously preventing spontaneous rupture of the MOF during a peel test. A series of card constructions with variation in all of these parameters were laminated and tested to measure the peel and rupture forces for the adhesive and MOF.

The dissimilar materials of the MOF are a root cause of the delamination of the card laminate. An increase in the bond strength between the microlayers of the MOF will result in a corresponding increase in measured peel forces of a card. Three sets of MOF materials were tested for bond strength in a card construction. These were coPEN/PMMA, PET/coPMMA, and coPEN/PETG, where the coPEN was made with a 90/10 ratio of PEN and PET monomers which were then co-polymerized. The interlayer adhesion of the MOF alone is difficult to measure, since the films typically do not cleave along a single interface across the width and length of a test strip. Instead, several interfaces are involved and layers are torn at the boundaries of these areas. Therefore, the actual peel forces that can be maintained with a card peel are more relevant. In the case of coPEN/PETG, a peel force of 15 to 20 N/cm can be reliably obtained on the laminate samples tested, with an extremely low incidence of MOF rupture when the MOF is bonded to the PVC with a 1 mil thick adhesive of hardness less than 10 megapascals (MPa)—no MOF ruptures were observed in approximately 40 test strips. On the other hand, no adhesive has been found that can provide a low incidence of rupture for the PET/coPMMA in card laminate with the same peel forces of 15-20 N/cm.

Adhesive thickness values tested ranged from about 12 to 50 μm (one-half to two mils).

The adhesive bond strength to the MOF can be adjusted by the choice of adhesive, and by the choice of primer coating on the MOF. The adhesives tested are listed in the examples below.

The durometer of the various adhesives was measured with a nano-indentation method. This method is useful because it can measure the modulus and hardness of an adhesive layer at its major surface before lamination into a card, or at its edge after the card has been laminated. Further details of the nano-indentation method are provided below.

The tensile strength of the MOF skin layer can become important in constructions where the MOF interlayer adhesion is low. Several MOF skin thickness values and materials were tested in the examples below, where such skin layers were composed of coPEN for the coPEN/PETG films, or PET for the PET/coPMMA films.

The effects of the MOF construction and adhesive types on the peel strength of a card laminate were evaluated from a series of film and card constructions, presented in the following examples. All of the example laminates were made to a thickness of about 0.75 mm, with variations in adhesive and MOF thickness values compensated with various PVC sheet thickness values. The peel tests performed were 180 degree peel tests on strips that were about 2.54 cm wide and about 12 cm long. A tab such as that shown in FIG. 4 was used to initiate peeling.

The adhesives studied were Transilwrap KRTY 1-1-1 described above; Quest PVC 4(3/1) A sold by Quest Films Inc. of Woodstock, Ill.; Transilwrap 3/1 and 2/1 ZZ; Bemis 5214 sold by Bemis Associates Inc. of Shirley, Mass.; and PETG, a copolyester sold as Eastar 6763 by Eastman Chemical Company, Kingsport, Tenn. The 3/1 and 2/1 nomenclature on some adhesives refers to a polymer backing material of 3 or 2 mil thickness, versus the thickness in mils of the actual adhesive material. In that regard, materials referred to herein as "adhesives" may actually be compound bonding layers comprising a layer of polymer material and a layer of adhesive. If a primer was used in a particular example, the primer described above in connection with layers 38a, 38b, which is made by 3M Company, of St. Paul, Minn. was used.

EXAMPLE 1

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| PET/coPMMA | KRTY 1-1-1 | 50 | 9 | 12 | 3 M 0.1-0.2 |

This is actually a comparative example, since it represents a card construction that uses the IR filter laminate currently on the market. Peel test results typically are 15 to 20 N/cm, but almost always result in an MOF rupture before the end of the strip.

EXAMPLE 2

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| PET/ coPMMA | Transilwrap 3/1 ZZ | 25 | 8 | 12 | 3 M 0.1-0.2 |

Same MOF construction as Example 1, but the adhesive is thinner and slightly softer. The peel forces ranged from 12 to 17 N/cm, and although the peel forces are smaller than for the KRTY adhesive of Example 1, occasional ruptures of the MOF were observed.

EXAMPLE 3

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| PET/ coPMMA | Quest PVC 4 (3/1) A | 25 | 19 | 12 | 3 M 0.1-0.2 |

Again, the same MOF construction as Example 1. But the adhesive of this example is over twice as hard as those of Examples 1 and 2. As a result, 5 out of 10 peels resulted in a ruptured film, even though the average peel force was only 9 N/cm.

EXAMPLE 4

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| PET/ coPMMA | Transilwrap 2/1 ZZ | 25 | 4 | 2 | Coextruded PETG, 12 |

The MOF used the same polymer materials as those of Examples 1-3, but arranged in a different construction as follows: there were two packets of alternating microlayers, each packet having 223 microlayers, the packets differing in thickness by a factor of 1.3, each packet being bounded by a 2 micron thick boundary layers of oriented PET (fusing in the middle to form a 4 micron separation between the packets). The outer boundary layers of oriented PET thus can be characterized as skin layers. The effect of the MOF skin layer on the peel tests is illustrated in this Example. This multilayer optical film of PET/coPMMA was coextruded with an outer layer of PETG instead of the usual thick PET skin layer. The amorphous PETG layer has a low tensile strength compared to the oriented PET. As a result, the peel test resulted in a ruptured MOF after short peels of about 1 cm. MOF made with PET/coPMMA and with 12 micron oriented PET skins (see Example 1) showed average peel lengths greater than about 3 cm. This difference is attributed to the higher tensile strength of the thicker PET skin layer of Example 1.

EXAMPLE 5

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| coPEN/ PETG | Transilwrap 2/1 ZZ | 25 | 4 | zero | Coextruded PETG, 12 |

The MOF used in this example has the same layer structure as in Example 4, with the PET replaced by coPEN and the coPMMA replaced by PETG. The protective boundary layers were PETG and the outer skin layers were also PETG, resulting in an MOF construction with no strain hardened skins. The outer skin layers of PETG are considered as primer layers for this film. In contrast to Example 4 however, this MOF with no strain hardened skins can survive a peel test in a laminate of PVC with a soft adhesive. The superior interlayer adhesion of the coPEN and PETG compared to PET and coPMMA results in a much higher delamination peel strength in a card. The average peel force was 19 N/cm.

In this and later MOF films that use the coPEN/PETG combination, the PETG layers have $n_x=n_y=n_z=1.564$, while the coPEN layers have in-plane indices $n_x=n_y=1.73$, and an out-of-plane index $n_z=1.51$.

EXAMPLE 6

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| coPEN/ PETG | Coextruded PETG | 12 | 138 | zero | None |

This example uses the same MOF construction as in Example 5. As an example of a card construction with a thin and very hard adhesive, multilayer infrared reflecting film samples of coPEN/PETG were constructed with outer skin layers of PETG. PETG and similar amorphous polyesters bond aggressively to PVC under heat and pressure which is typically used in card manufacturing. With this construction, thick card stock of PVC can be directly bonded to the IR blocking optical film with no additional adhesive layers. However, the PETG is much harder than the Transilwrap KRTY or ZZ adhesives. When subjected to the standard peel test, the MOF ruptures immediately.

EXAMPLE 7

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| coPEN/ PETG | Transilwrap 3/1 ZZ | 25 | 8 | 12 | 3M 0.1-0.2 |

Figure 7:
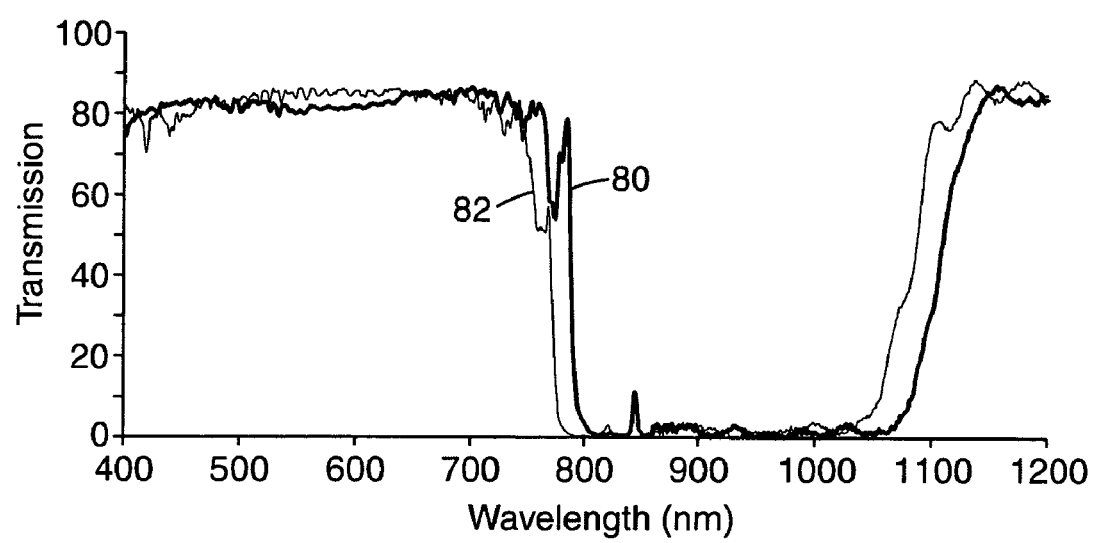
FIG. 7 is a spectral transmission graph for such new multilayer optical film alone, and for a card incorporating the new laminate construction.

The MOF of this example used the same polymer materials, coPEN and PETG, as those of Examples 5-6, in the following construction: there were two packets of alternating microlayers, each packet having 223 microlayers, the packets differing in thickness by a factor of 1.16, each packet being bounded by a 2 micron thick boundary layer of PETG (fusing in the middle to form a 4 micron separation between the packets). A 12 micron layer of oriented coPEN was coextruded as a skin layer. The optical transmission spectrum of this MOF, and of the MOF in the card laminate, is shown as curve 82 in FIG. 7. Peel force average on 10 strips was 22.4 N/cm, with no ruptures of the MOF.

EXAMPLE 8

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| coPEN/ PETG | Transilwrap 2/1 ZZ | 25 | 4 | 12 | 3M 0.1-0.2 |

This example used the same construction and polymer materials for the MOF as Example 7, but with a measurably softer adhesive. Although the ZZ adhesive layer in this 2/1 construction should be the same as in the 3/1 construction, there may be lot-to-lot variations in the adhesive harness values. Peel force average on 10 strips was 25.6 Nt/cm, which is higher than that of Example 7. This is consistent with the lower measured hardness value of this adhesive. Again, no ruptures occurred on these peel tests.

EXAMPLE 9

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| coPEN/ PETG | Bemis 5214 | 75 | 33 | | 3 M, 0.3-0.4 |

The MOF of this example used the same construction and materials as Examples 5 and 6. Although not as hard as the adhesive of example 6, the hardness of this adhesive (33 MPa), combined with an excellent bond of this adhesive with the priming layer, resulted in immediate rupture of the coPEN/PETG MOF on all test strips. If the bonding of this adhesive to the MOF were adjusted to a lower value via a change in the type of primer layer, one may be able to reduce or eliminate the rupture of the MOF used here.

EXAMPLE 10

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| coPEN/ PETG | Quest PVC 4 (3/1) A | 25 | 19 | 12 | 3 M 0.1-0.2 |

The MOF of this example used the same construction and materials as Examples 7 and 8. Somewhat softer than the Bemis 5214 adhesive, card laminates made with the Quest 3/1 adhesive did not have any coPEN/PETG MOF ruptures during the peel tests. This is in contrast to Example 3 wherein 5 out of 10 PET/coPMMA laminates made with this same adhesive ruptured during peel tests. The average peel force was 9 N/cm, which is consistent with peel forces measured in Example 3 which used the same primer layer on the MOF.

EXAMPLE 11

| MOF construction | Adhesive name | Adhesive thickness each side (microns) | Adhesive hardness (MPa) | MOF Skin thickness each side (microns) | MOF Primer and thickness (microns) |
|---|---|---|---|---|---|
| PET/ coPMMA | Transilwrap KRTY 1-1 | 25 | Not measured | 12 micron | 3 M 0.1-0.2 |

Example 11 was constructed with all of the materials of Example 1, including the MOF, with the omission of the adhesive layer on one side of the Transilwrap product. A specially constructed adhesive layer, in which only one side of a 1 mil PET was coated with the same KRTY adhesive as in the KRTY 1-1-1 product, was used to laminate the PET/coPMMA product into a PVC card laminate. The KRTY coated side of the 1-1 construction was placed facing the MOF and the non-coated side of the PET was facing the PVC. This did not produce a commercially useable card because the PVC does not bond well to the PET, but nonetheless, a laminate with 50% less adhesive than Example 1 could be made for testing haze, transmission and clarity. The laminate was pressed for 15 minutes at 285° F. at 100 PSI, similar to all of the other examples. As shown in the haze and clarity table below, the haze was reduced to less than 9%, and the clarity increased to 97. Since the peel test for the KRTY 1-1-1 laminates of Example 1 results in rupture of the MOF, a thinner adhesive such as this 1/1 construction, which could be made with PVC as in the 2/1 or 3/1 ZZ adhesives, would only result in a less robust PET/coPMMA based IR blocking card. However, the results of Examples 7 and 8 clearly show that by changing to the appropriate material set, an MOF based card can be made that does not rupture in a peel test, and will result in a card with superior durability and less haze. The thinner adhesive is also expected to result in less angel hair in card punching.

Further laminate samples were constructed using a multilayer optical film similar to that of Examples 5 and 6, but where the PETG was replaced with PMMA. The protective boundary layers within the MOF were of coPEN; the skin layers were also of coPEN and were 12 microns thick. The adhesive and primer were the same as in Example 1. During peel tests, the samples ruptured immediately. No meaningful measurements could be obtained.

Haze, transmission and clarity values were obtained on 0.75 mm thick card laminates made with all of the adhesives using a Haze-gard Plus instrument from BYK Gardner. The manufacturer describes the clarity parameter as a measure of "see-through quality".

Haze and Clarity Data:

| Sample | Haze | Transmittance | Clarity | Angel hair |
|---|---|---|---|---|
| Bemis 5214 | 6.47 | 84.3 | 96.2 | Not tested |
| Quest PVC 4 (3/1) A | 5.32-7.27 | 83.6-89.2 | 96.8-98.1 | None |
| Transilwrap ZZ | 8.37-12 | 81.7-86.2 | 98 | low |
| Transilwrap KRTY 1-1-1 | 14-41.5 | 79-83 | 71.4-93.5 | high |
| Transilwrap KRTY 1-1 | 8.2-8.9 | 83-84 | 97 | Not tested |
| coPEN/PETG MOF w/ PVC, no adhesive | 6.89 | 85.4 | 97 | Not tested |

A tabulated summary of Hardness and Elastic Modulus is presented below. A generic polymer, fluorel was also tested in x-section as a check as to accuracy of the measurement method. The nominal value is about 21 MPa.

| Adhesive Sample | TOP DOWN Modulus E avg (MPa) | TOP DOWN Hardness H (MPa) | X-SECTION Modulus E avg (MPa) | X-SECTION Hardness H (MPa) |
|---|---|---|---|---|
| Transilwrap 2/1 ZZ | 45 ± 20 | 4 ± 2 | | |
| Transilwrap 3/1 ZZ | 67 ± 30 | 8 ± 3 | 86 ± 10 | 10 ± 1 |
| Transilwrap KRTY 1-1-1 | 129 ± 20 | 9 ± 2 | 106 ± 2 | 5 ± 1 |
| Quest PVC 4(3/1)A | 172 ± 40 | 19 ± 4 | 198 ± 40 | 11 ± 2 |
| Bemis 5214 | 320 ± 10 | 33 ± 2 | | |
| PETG skins | 1,960 ± 40 | 138 ± 3 | | |
| Fluorel std. | | | 34 | 1.33 |

In summary, the use of a thinner adhesive layer, and the option to select from a variety of adhesives, can provide a card with improved clarity and reduced manufacturing problems. The appropriate choice of MOF construction can maintain acceptable physical properties such as delamination strength and the capability to pass the standard flex tests. To counteract the effect of making the adhesive thinner, either the MOF skin layer can be made with higher tensile strength, or the interlayer adhesion of the MOF layers can be increased. The skin layers of the existing IR film laminate product are currently at about 30% (15% each side) of the total film thickness. A significant increase of 2× or more in their thickness is difficult to achieve and the linearity of the skin thickness/film breakage relationship at high skin thickness is still unknown. For this reason, polymer materials combinations having higher cohesion than the PET/acrylic system were studied. The polymer pair of coPEN/PETG has been identified for use in anoptical multilayer film construction with improved interlayer adhesion compared to the PET/acrylic system.

The peel forces described above relate to the bond between the adhesive layer and the outer surface, or skin layer, of the multilayer optical film. If the interlayer adhesion of the multilayer optical film is too low, the forces on the skin layer will cause it to pull away from the rest of the optical layers, resulting in a rupture of the optical film. To measure the interlayer adhesion values of the optical film layers themselves, the film can be laminated on both sides to another film such as e.g., a Transilwrap 3/1 zz or 3/1 KRTY adhesive film, with the PVC layers facing outward. After laminating and cutting into strips, the strips can be scored with a razor so that the cut penetrates into the optical film layers. The strip can then be bent along the cut until it snaps, creating a delamination along some boundary between layers of the optical film. A 90 degree or 180 degree peel force test can then be made with the resulting sample.

Care must be taken in making the coPEN/PETG multilayer film to insure a high interlayer adhesion. Even though the coPEN and PETG are similar materials in that they are both co-polyesters and the extruded cast web has extremely high interlayer adhesion, the orientation conditions must be properly controlled to insure that the finished film also has similar adhesion between layers. The orientation process typically involves stretch ratios of about 3 to 1 or more, in each in-plane direction. This results in about a ten-fold or more reduction in all layer thicknesses, including the interlayer mixing zone of adjacent layers. The high index layers are designed to crystallize upon orientation as well, which can also affect the cohesive strength of the material within a single layer. Thus the process of orienting a film can result in a reduction of the cohesive forces that resist delamination of an oriented multilayer film compared to the cast web interlayer adhesion.

We have found that the interlayer adhesion of oriented coPEN/co-polyester multilayer films improve with higher heat set (annealing) temperatures and longer heat set times after stretching. The heat set temperature after stretching can be increased until the film melts in the tenter, or becomes too brittle to handle after exiting the tenter. Typical heat set zone control temperatures for PET, PEN or any of the coPENs in a tenter are about 230° C. to 245° C. No heat setting, or heat setting much below this range may result in reduced multilayer film cohesion, depending on the stretch temperatures.

In summary, higher heat set temperatures and increased heat setting times have been found to improve the coPEN/PETG film interlayer adhesion, with the time and temperature limits determined experimentally by observing film uniformity and mechanical properties such as thermal shrinkage.

Oriented films typically shrink when later reheated above their glass transition values. Shrinkage values typically are reduced by higher heat set temperatures and longer heat set times. This can cause problems in card lamination if the card materials such as, e.g., the thick PVC layers have higher shrinkage values than the optical film. The optical film may then wrinkle as the entire laminate shrinks in lateral dimensions. Such shrinkage issues can typically be resolved by variation of the card processing parameters such as heat up rates, press temperatures and pressures, and cool down rates, pressures, and temperatures. Selection of PVC grades or other sheet materials that more closely match the shrinkage rates of the optical film can also reduce the tendency of the film to wrinkle during card manufacturing.

Adhesive Selection

Figure 6:
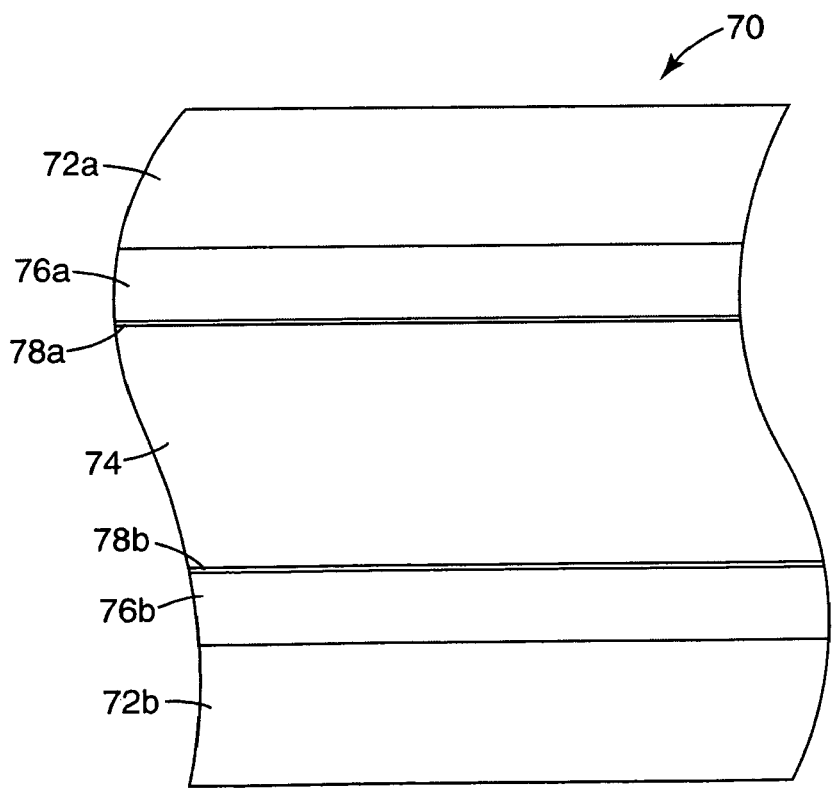
FIG. 6 is a schematic sectional view of a new laminate construction comprising a new multilayer optical film.

Although there exist a wide variety of soft, clear, adhesives which exhibit low haze, the number of such adhesives that can be used under pressures of 100 to 200 psi at high temperature such as 285° F. (141° C.) and that bond well to both PVC and polyesters is rather small. The soft adhesives described above exhibit some haze, and therefore should be used at minimum thickness in order to construct a card with high clarity and good card punching properties. The adhesive layer can be minimized if a two sided construction such as the Transilwrap 3/1 zz, 2/1 zz or the Quest 3/1 adhesive is used, as illustrated in FIG. 6. In that figure, an IR filter laminate 70 comprises thin outer PVC layers 72a, 72b (less than 5 mils in thickness, typically 1 to 2 mils), adhesive layers 76a, 76b, primer layers 78a, 78b, and MOF 74. The minimum thickness requirement results in a need for an MOF with good layer cohesion.

Alternative Materials

MOF can be incorporated into cards made from materials other than PVC. The requirements for the adhesive are still as described above. A relatively thick (greater than about 10 microns) soft (less than 30 Mpa) adhesive must still be used in combination with an MOF with relatively high interlayer cohesion such as the coPEN/PETG examples described above. Common materials useful for such cards are PETG and polypropylene. From the examples above, it is shown that the same adhesives described here for bonding to MOF will also bond to PETG. For polypropylene, an appropriate surface treatment such as a corona discharge and primer layer may be needed. Oriented polyester layers can also be incorporated into a card in order to reduce the PVC content, with bonding to the thick cardstock layers accomplished by appropriate priming layers such as e.g. sulfopolyesters, or coextruded PETG layers. Furthermore, the IR filter laminate of FIG. 6 can be composed entirely of PVC-free materials, but can then be used with either PVC or non-PVC cardstock depending upon the card manufacturer's needs or requirements.

Glossary of Selected Terms

"Card" for purposes of this application means a substantially flat, thin, stiff article that is sufficiently small for personal use. Examples include but are not limited to financial transaction cards (including credit cards, debit cards, and smart cards), identification cards, and health cards.

"Infrared" or "IR" for purposes of this application refers to electromagnetic radiation whose wavelength is about 700 nm or more. This of course includes but is not limited to near infrared wavelengths from about 700 nm to about 2500 nm.

"Multilayer optical film" (or "MOF") for purposes of this application means a film that comprises a stack of layers that reflect electromagnetic radiation by constructive interference. Exemplary multilayer optical films can be entirely polymeric in composition for ease of manufacture, handling, and tailorability. Cholesteric reflective polarizers and mirrors are also considered to be multilayer optical film for purposes of this application.

"Reflection band" for purposes of this application means a spectral region of relatively high reflectance bounded on either side by regions of relatively low reflectance.

"Visible light" for purposes of this application means electromagnetic radiation whose wavelength is in the range from about 400 nm to about 700 nm.

A "visible light transmissive card" or "VLT card" for purposes of this application means a card that has at least one area through which at least a portion of visible light is transmitted, which area preferably has an average transmission (measured with an integrating sphere to collect all light scattered in forward directions through the card) over the range from 400 to 700 nm of at least 50%, more preferably at least 70% or even 80%. Note that this definition of "transparent card" also encompasses cards that may have a substantial amount of haze (and hence be translucent) and cards that are tinted or otherwise colored, such as by the incorporation of a dye or pigment, or by suitable placement of the reflection band of a multilayer optical film.

"Elastic modulus" and "hardness" of various adhesives reported herein, for purposes of this application, mean those properties measured via the Nanoindentation Method described below. With this method, which involves the use of a microprobe, the modulus and hardness of a card layer can be measured on its free surface before lamination, or on the edge of the card laminate:

Background/Procedure—prior to testing, samples are mounted on ¾ inch diameter aluminum cylinders which serve as fixtures in a Nano DCM translation stage. (Nano Indenter XP from MTS Nano Instruments, Minneapolis, Minn. or Berlin Germany) For all experiments a diamond Berkovich probe is used. The nominal loading rate is set at 10 nm/s with spatial drift setpoint set at 0.3 nm/s maximum. A constant strain rate experiment at 0.05/s to a depth of 1500 nm, is used to test as-received films in a 'top down' mode. Cross-sectioned samples are tested to 500 nm depth. The region to be characterized is located as seen top-down as viewed through a video screen with 400× magnification. The test regions are selected locally with 400 X video magnification of the XP to insure that tested regions are representative of the desired sample material, i.e. free of voids, inclusions, or debris. Furthermore, microscope optical axis—to—indenter axis alignment is checked and calibrated prior to testing by an iterative process where test indentations are made into a fused quartz standard, with error correction provided by software in the XP.

Nanoindentation Measurements—the sample surface is located via a surface find function where the probe approaches the surface with a spring stiffness in air that changes significantly when the surface is encountered. Once the surface is encountered, load-displacement data is acquired as the probe indents the surface. This data is then transformed to Hardness and Elastic Modulus material properties based on the methodology described below. The experiment is repeated in different areas of the sample so that a statistical assessment can be made of the mechanical properties.

Determination of "Elastic Modulus"—the Elastic Modulus determined directly from the load-displacement data is a composite Modulus, i.e. the Modulus of the indenter-to-sample mechanical system. The composite Modulus for these load-displacement indentation experiments can be determined from:

$$S = 2\beta \sqrt{\frac{A}{\pi}} F$$

where

"S" is the contact stiffness, determined via the MTS Nano Instrument's Continuous-Stiffness-Method, by solving the differential equation relating a periodic forcing function $$f(t, \varpi) = kx + b\frac{dx}{dt} + m\frac{dx^2}{dt^2}$$

to the coefficients of sample-indenter mechanical system, i.e. the in-phase and out-of-phase components of the displacement response to the forcing function, yield the in-phase spring constant k, (thus the stiffness—hence contact area), and out of phase damping coefficient, b. The default excitation frequency for these tests is 75 Hz.

"A" is the area of contact (m$^2$), assuming that the indentation replicates the shape of the indenter during indentation, the indenter geometry is modeled via analytic geometry so that the projected area, A=h$^2$+higher order terms, where h is displacement depth, and higher order terms are empirically measured.

"β"=1.034 for Berkovich indenters

"F" is the Composite Modulus [Gpa]

Then the sample material's Elastic Modulus (E) is obtained from:

$$1/F=(1-u^2)/K+(1-v^2)/E$$

where

"u" is the Poisson Ratio of the diamond indenter=0.07

"K" is the Elastic Modulus of the diamond indenter=1141 Gpa

"v" is the Poisson Ratio of the sample (an assumption must be made here—~0.4 for these samples)

"Hardness"—hardness is defined as the threshold contact stress, expressed in giga or mega Pascals, for the onset of plastic flow of the specimen. It is expressed as:

$$H=P/A$$

where

"H" is the Hardness [Gpa];

"P" is the load necessary for plastic flow; and

"A" is the plastic contact area.

Various modifications and alterations of this invention will be apparent to those skilled in the art without departing from the scope and spirit of this invention, and it should be understood that this invention is not limited to the illustrative embodiments set forth herein.

What is claimed is:

1. A visible light transmissive card, comprising:
a first and second polymer layer each having a thickness of at least 5 mils (125 μm);
a multilayer optical film disposed between the first and second polymer layers, the film having a reflection band at normal incidence substantially covering the range 800-1000 nm; and
a plurality of adhesive layers between the multilayer optical film and the first and second polymer layers;
wherein the card has a haze no greater than 12%.

2. The card of claim 1, wherein the card has average transmission from 800-1000 nm no greater than 8%.

3. The card of claim 2, wherein the card has average transmission from 800-1000 nm of no greater than 5%.

4. The card of claim 1, wherein the card has average transmission of at least 70% from 400-700 nm.

5. The card of claim 4, wherein the plurality of adhesive layers collectively account for no more than about 3 mils thickness of the card.

6. The card of claim 1, wherein the plurality of adhesive layers consist essentially of a first and second adhesive layer disposed between the multilayer optical film and the first and second polymer layers respectively.

7. The card of claim 1, wherein the plurality of adhesive layers contact major surfaces of the multilayer optical film directly or through a thin primer layer.

8. The card of claim 1, wherein the card is substantially free of polyvinyl chloride (PVC).

9. A card, comprising:
a first and second polymer layer each having a thickness of at least 5 mils (125 μm);
a multilayer optical film disposed between the first and second polymer layers, the film having a reflection band at normal incidence covering a desired spectral region; and
a plurality of adhesive layers between the multilayer optical film and the first and second polymer layers;
wherein the multilayer optical film comprises alternating layers of coPEN and a copolyester;
wherein the copolyester comprises PETG.

10. The card of claim 9, wherein the adhesive layers are at least about 0.5 mil (13 μm) thick and have a hardness of less than about 30 MPa.

11. The card of claim 9, wherein the card is substantially free of polyvinyl chloride (PVC).

12. The card of claim 9, wherein the card has average transmission of at least 70% from 400-700 nm.

13. The card of claim 9, wherein the card has a haze of no greater than 12%.

14. The card of claim 9, wherein the card has average transmission from 800-1000 nm no greater than 8%.

15. A card, comprising:
a first and second polymer layer each having a thickness of at least 5 mils (125 μm);
a multilayer optical film disposed between the first and second polymer layers, the film having a reflection band at normal incidence covering a desired spectral region; and
a plurality of adhesive layers between the multilayer optical film and the first and second polymer layers;
wherein the multilayer optical film comprises alternating layers of coPEN and a copolyester;
wherein the adhesive layers are at least about 0.5 mil (13 μm) thick and have a hardness of less than about 30 MPa.

16. The card of claim 15, wherein the card has average transmission from 800-1000 nm no greater than 8%.

17. A card, comprising:
a first and second polymer layer each having a thickness of at least 5 mils (125 μm);
a multilayer optical film disposed between the first and second polymer layers, the film having a reflection band at normal incidence covering a desired spectral region; and
a plurality of adhesive layers between the multilayer optical film and the first and second polymer layers;
wherein the multilayer optical film comprises alternating layers of coPEN and a copolyester;
wherein the card is substantially free of polyvinyl chloride (PVC).

18. The card of claim 17, wherein the card has average transmission from 800-1000 nm no greater than 8%.

19. A card, comprising:
a first and second polymer layer each having a thickness of at least 5 mils (125 μm);
a multilayer optical film disposed between the first and second polymer layers, the film having a reflection band at normal incidence covering a desired spectral region; and
a plurality of adhesive layers between the multilayer optical film and the first and second polymer layers;
wherein the multilayer optical film comprises alternating layers of coPEN and a copolyester;
wherein the card has a haze of no greater than 12%.

20. The card of claim 19, wherein the card has average transmission from 800-1000 nm no greater than 8%.

* * * * *

UNITED STATES PATENT AND TRADEMARK OFFICE
CERTIFICATE OF CORRECTION

PATENT NO.          : 7,271,951 B2
APPLICATION NO.  : 11/132114
DATED                   : September 18, 2007
INVENTOR(S)        : Michael F. Weber It is certified that error appears in the above-identified patent and that said Letters Patent is hereby corrected as shown below:

Column 3
Line 60, delete "$\Delta N_j$" and insert -- $\Delta nj$ --, therefor.

Line 64, delete "$\Delta n_x$" and insert -- $\Delta n_z$ --, therefor.

Line 67, delete "$\Delta n_x \leqq 0.25*$" and insert -- $\Delta n_z \leqq 0.25*$ --, therefor.

Column 4
Line 1, delete "anoptical" and insert -- an optical --, therefor. (Consider Space)

Signed and Sealed this

Eighth Day of April, 2008

JON W. DUDAS
*Director of the United States Patent and Trademark Office*